(12) United States Patent
Fukasawa et al.

(10) Patent No.: US 7,495,557 B2
(45) Date of Patent: Feb. 24, 2009

(54) RADIO TAG COMMUNICATION SYSTEM

(75) Inventors: Toru Fukasawa, Tokyo (JP); Masataka Ohtsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 328 days.

(21) Appl. No.: 10/592,131

(22) PCT Filed: Jul. 23, 2004

(86) PCT No.: PCT/JP2004/010499

§ 371 (c)(1),
(2), (4) Date: Sep. 8, 2006

(87) PCT Pub. No.: WO2006/011187

PCT Pub. Date: Feb. 2, 2006

(65) Prior Publication Data

US 2007/0273526 A1    Nov. 29, 2007

(51) Int. Cl.
*G08B 13/20* (2006.01)

(52) U.S. Cl. ............... 340/572.1; 340/10.2; 340/10.3; 340/572.7; 235/436; 235/439

(58) Field of Classification Search ............... 340/10.1
See application file for complete search history.

(56) References Cited

FOREIGN PATENT DOCUMENTS

| JP | 2000-013287 A | 1/2000 |
|----|---------------|--------|
| JP | 2001-191919 A | 7/2001 |
| JP | 2003-249871 A | 9/2003 |
| JP | 2003-283367 A | 10/2003 |

*Primary Examiner*—Jeff Hofsass
*Assistant Examiner*—Ojiako Nwugo
(74) *Attorney, Agent, or Firm*—Birch, Stewart, Kolasch & Birch, LLP

(57) ABSTRACT

A radio tag communication system, when a plurality of RW apparatuses are arranged in such a manner that communication areas of adjacent RW apparatuses overlap one another, makes the polarized waves of the adjacent RW apparatuses orthogonal to each other, and causes the tag to switch the polarization direction with the movement of the tag. This makes it possible to prevent signal interference even when the communication areas are expanded.

7 Claims, 3 Drawing Sheets

RADIO TAG COMMUNICATION SYSTEM

TECHNICAL FIELD

The present invention relates to a radio tag communication system for enabling a tag and reader/writer apparatuses (called "RW apparatuses" from now on) to carry out radio communication.

BACKGROUND ART

The radio tag communication system has a tag and RW apparatuses carry out radio communication. The tag includes a dipole antenna A and a dipole antenna B, and a tag IC generates circularly polarized waves with a phase difference of 90° from the dipole antennas A and B (see Patent Document 1, for example).

The tag, however, includes no power supply. Accordingly, receiving the high-frequency signal transmitted from the RW apparatus with the dipole antennas A and B, the tag rectifies the high-frequency signal and stores the power, and carries out radio communication with the RW apparatus using the power.

Thus, the system has a characteristic in that the communication area between the tag and RW apparatus is limited to a range of a few meters.

Accordingly, a plurality of RW apparatuses must be arranged to implement a communication area beyond a few meters.

In addition, to recognize all the tags in the communication area beyond a few meters, the communication area must be continuous without a break.

In this case, the plurality of RW apparatuses must have communication areas that overlap one another.

Patent Document 1: Japanese patent application laid-open No. 2003-249871 (pp. 12-13 and FIG. 2).

With the foregoing configuration, the conventional radio tag communication system enables, when the communication areas of RW apparatuses A and B overlap, the tag and both the RW apparatuses A and B to carry out radio communication within the overlapping areas. However, the conventional radio tag communication system has a problem of disturbing the radio communication between the tag and the RW apparatus A when the RW apparatus B transmits a signal while the tag carries out the radio communication with the RW apparatus A because the signal from the RW apparatus B causes interference with the signal from the RW apparatus A.

The present invention is implemented to solve the foregoing problem. Therefore it is an object of the present invention to provide a radio tag communication system capable of preventing the interference of the signal even when extending the communication area.

DISCLOSURE OF THE INVENTION

The radio tag communication system in accordance with the present invention, having a plurality of reader/writer apparatuses arranged in a manner that communication areas of adjacent reader/writer apparatuses overlap one another, makes polarized waves of the adjacent reader/writer apparatuses orthogonal to each other, and causes the tag to switch a polarization direction with a movement of the tag.

This offers an advantage of being able to prevent the signal interference even when the communication areas are expanded.

BEST MODE FOR CARRYING OUT THE INVENTION

The best mode for carrying out the invention will now be described with reference to the accompanying drawings to explain the present invention in more detail.

Embodiment 1

Figure 1:
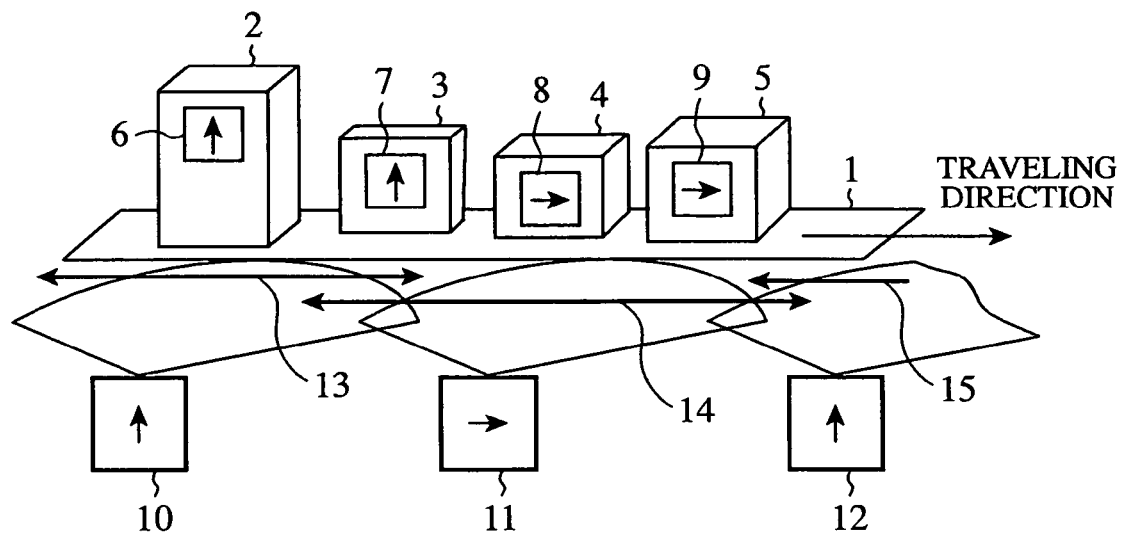
FIG. 1 is a diagram showing a configuration of a radio tag communication system of an embodiment 1 in accordance with the present invention.

FIG. 1 is a diagram showing a configuration of a radio tag communication system of an embodiment 1 in accordance with the present invention.

In FIG. 1, a conveyor 1, which is installed on a manufacturing line, for example, one-dimensionally carries articles 2-5 on which tags 6-9 are put. In the example of FIG. 1, the articles 2-5 move toward the right.

The articles 2-5 are products in progress, for example, and can differ in size from each other.

The tags 6-9, which are put on the articles 2-5, have a function of holding unique information on the articles 2-5 (such as identifying information of the articles), and a function of carrying out radio communication with RW apparatuses 10-12, which are reader/writer apparatuses. In addition, the tags 6-9 have a function of switching the polarization direction as they move on.

The RW apparatuses 10-12 are arranged one-dimensionally along the direction in which the conveyor 1 moves the articles 2-5 in such a manner that the communication area 13 of the RW apparatus 10 and the communication area 14 of the RW apparatus 11 overlap each other, and the communication area 14 of the RW apparatus 11 and the communication area 15 of the RW apparatus 12 overlap each other. In addition, the RW apparatuses 10-12 carry out radio communication with the tags 6-9 to read and write the information held in the tags 6-9. In this case, polarized waves of the RW apparatuses 10 and 12 are set at V polarization, and a polarized wave of the RW apparatus 11 is set at H polarization. Thus, the polarized waves of the adjacent RW apparatuses are made orthogonal to each other.

Figure 2:
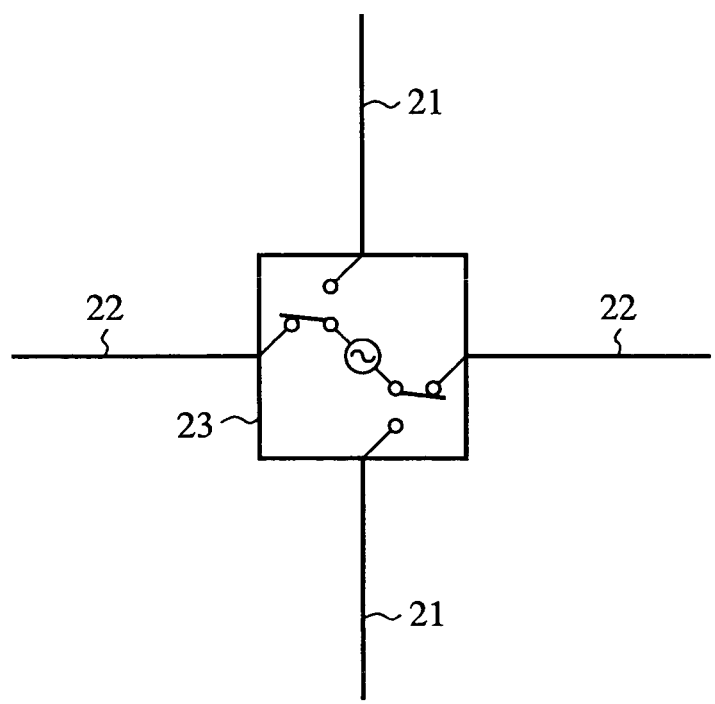
FIG. 2 is a diagram showing a configuration of a tag of the radio tag communication system of the embodiment 1 in accordance with the present invention.

FIG. 2 is a diagram showing a configuration of the tag of the radio tag communication system of the embodiment 1 in accordance with the present invention.

In FIG. 2, a dipole antenna 21 is excited when it is set in an excitable state by an IC 23 and is located within the communication area 13 or 15 of the RW apparatus 10 or RW apparatus 12. When the dipole antenna 21 is excited, an up arrow "↑" is written inside the tags in FIG. 1.

A dipole antenna 22 is excited when it is set in an excitable state by the IC 23 and is located within the communication area 14 of the RW apparatus 11. When the dipole antenna 22 is excited, a right arrow "→" is written inside the tags in FIG. 1.

Receiving a switching request signal from the RW apparatuses 10-12, the IC 23 carries out the switching process of the dipole antennas 21 and 22 in the excitable state. More specifically, when the dipole antenna in the excitable state at present is the dipole antenna 21, the dipole antenna 22 is set in the excitable state, and when the dipole antenna in the excitable state is the dipole antenna 22, the dipole antenna 21 is set in the excitable state.

The IC 23 includes a memory for holding the unique information on the articles 2-5, and a rectifying section. When the dipole antenna 21 or 22 receives a call signal, that is, a high-frequency signal transmitted from the RW apparatuses 10-12, the rectifying section rectifies the call signal, converts it to driving power, and stores the power.

Next, the operation will be described.

In a manufacturing line, for example, some processes are added while moving the articles 2-5 on the conveyor 1.

The tags 6-9 attached to the articles 2-5 hold, as unique information on the articles 2-5, information on the process of the articles 2-5 up to now, information on the process from now on, and test results. The communication areas 13-15 correspond to a working area of a process to be added newly.

In addition, the tags 6-9 hold information on the process to be added in the communication areas 13-15, and the process is added according to the information. The process added in the communication areas 13-15, and the information on the test results obtained therein is successively recorded in the tags 6-9.

Furthermore, the entire process is controlled by reading out the information held in the tags 6-9 as needed.

To control all the articles 2-5 on a real-time basis in the manufacturing line, it is necessary for the tags 6-9 put on the articles 2-5 and the RW apparatuses 10-12 to exchange information without interruption.

To achieve this, the communication area 13 of the RW apparatus 10 and the communication area 14 of the RW apparatus 11 overlap each other, and the communication area 14 of the RW apparatus 11 and the communication area 15 of the RW apparatus 12 overlap each other.

Since the articles 2-5 differ in size, the RW apparatuses 10-12 must be separated from the tags 6-9 to some extent. The tags 6-9 carry out radio communication with neighboring one of the RW apparatuses 10-12.

For example, the tags 6 and 7 carry out radio communication with the RW apparatus 10, and the tags 8 and 9 carry out radio communication with the RW apparatus 11.

In this case, since the tag 6 is present only within the communication area 13 of the RW apparatus 10, and the tags 8 and 9 are present only within the communication area 14 of the RW apparatus 11, no interference occurs with the signals from the other RW apparatuses.

However, since the tag 7 is present in an area in which the communication area 13 of the RW apparatus 10 and the communication area 14 of the RW apparatus 11 overlap, when the RW apparatus 11 transmits a signal while the tag 7 is carrying out radio communication with the RW apparatus 10, it is likely that the signal interferes with the signal transmitted from the RW apparatus 10.

The present embodiment 1 prevents the interference of the signal as follows.

For example, as for the tag 7 put on the article 3, if its dipole antenna 21 is set in the excitable state (V polarization state) when it moves into the communication area 13 of the RW apparatus 10, the dipole antenna 21 receives the call signal, the high-frequency signal, transmitted from the RW apparatus 10. The call signal is a signal which the RW apparatus transmits to detect the tag existing within its communication area, and which the tag uses for storing the power.

When the dipole antenna 21 receives the call signal transmitted from the RW apparatus 10, the rectifying section in the IC 23 of the tag 7 rectifies the call signal, converts it to the driving power, and stores the power.

Thus, the IC 23 of the tag 7 can operate by the use of the power thereafter.

The IC 23 of the tag 7 transmits a response signal to the call signal to the RW apparatus 10 via the dipole antenna 21.

After that, when the dipole antenna 21 receives an information read request signal transmitted from the RW apparatus 10, the IC 23 of the tag 7 transmits the information held in its memory to the RW apparatus 10 via the dipole antenna 21.

In addition, when the dipole antenna 21 receives an information rewrite request signal transmitted from the RW apparatus 10, the IC 23 of the tag 7 rewrites the information held in the memory according to the information rewrite request signal.

Furthermore, when the dipole antenna 21 receives an information write request signal transmitted from the RW apparatus 10, the IC 23 of the tag 7 stores new information in response to the information write request signal.

The tag 7 carries out the radio communication with the RW apparatus 10 as described above. In this case, even if the RW apparatus 11 transmits a signal during the communication between the tag 7 and the RW apparatus 10, no signal interference occurs. This is because although the dipole antenna 21 is set in the excitable state (V polarization state), the dipole antenna 22 is not set in the excitable state (H polarization state).

After completing the desired processing for the tag 7, the RW apparatus 10 transmits a switching request signal that instructs switching of the polarization direction.

When the dipole antenna 21 receives the switching request signal transmitted from the RW apparatus 10, the IC 23 of the tag 7 switches the dipole antenna in the excitable state from the dipole antenna 21 to the dipole antenna 22 (thereby setting in the H polarization state).

This disables the radio communication of the tag 7 with the RW apparatus 10, but enables the radio communication with the RW apparatus 11.

When the RW apparatus 11 transmits a call signal, the dipole antenna 22 of the tag 7 receives the call signal.

When the dipole antenna 22 receives the call signal transmitted from the RW apparatus 11, the rectifying section in the IC 23 of the tag 7 rectifies the call signal, converts it to the driving power, and stores the power.

The IC 23 of the tag 7 transmits a response signal to the call signal to the RW apparatus 11 via the dipole antenna 22.

After that, when the dipole antenna 22 receives an information read request signal transmitted from the RW apparatus 11, the IC 23 of the tag 7 transmits the information held in its memory to the RW apparatus 11 via the dipole antenna 22.

In addition, when the dipole antenna 22 receives an information rewrite request signal transmitted from the RW apparatus 11, the IC 23 of the tag 7 rewrites the information held in the memory according to the information rewrite request signal.

Furthermore, when the dipole antenna 22 receives an information write request signal transmitted from the RW apparatus 11, the IC 23 of the tag 7 stores new information in response to the information write request signal.

The tag 7 carries out the radio communication with the RW apparatus 11 as described above. In this case, even if the RW apparatus 10 transmits a signal during the communication between the tag 7 and the RW apparatus 11, no signal interference occurs. This is because although the dipole antenna 22 is set in the excitable state, the dipole antenna 21 is not set in the excitable state.

As is clear from the foregoing description, the present embodiment 1 is configured in such a manner that when the plurality of RW apparatuses are arranged so that the communication areas of the adjacent RW apparatuses overlap one another, the polarized waves of the adjacent RW apparatuses are made orthogonal, and each tag switches the polarization direction in the course of their movement. As a result, the present embodiment 1 offers an advantage of being able to prevent the interference of the signal even if the communication area is expanded.

Incidentally, such a configuration is also possible in which when the IC 23 of the tag 7 receives the switching request signal from the RW apparatus 10, for example, the IC 23 can transmit, before switching the dipole antenna in the excitable state, a switching confirmation signal indicating that the switching of the dipole antenna is to be carried out to the RW apparatus 10 via the dipole antenna 21.

In this case, the RW apparatus 10 can recognize that the dipole antenna in the excitable state is to be switched.

In addition, when the RW apparatus 10 notifies the RW apparatus 11 that the dipole antenna of the tag 7 is to be switched (through a wire or wireless line extended between the RW apparatus 10 and RW apparatus 11), the RW apparatus 11 can recognize that it can communicate with the tag 7.

Alternatively, such a configuration is also possible in which when the IC 23 of the tag 7 receives the switching request signal from the RW apparatus 10, for example, the IC 23 can transmit, after switching the dipole antenna in the excitable state, a switching confirmation signal indicating that the switching of the dipole antenna is completed to the RW apparatus 11 via the dipole antenna 22.

In this case, if the RW apparatus 11 transfers the switching confirmation signal to the RW apparatus 10, the RW apparatus 10 can recognize that the dipole antenna in the excitable state has been switched.

Furthermore, the RW apparatus 11 can recognize that it can communicate with the tag 7.

Although the present embodiment 1 is described by way of example in which the tags 6-9 and RW apparatuses 10-12 employ the linearly polarized waves, this is not essential. For example, even if the RW apparatuses 10-12 and tags 6-9 employ circularly polarized waves or elliptically polarized waves, the present embodiment 1 offers the same advantage as long as it employs two orthogonal polarized waves.

Although the present embodiment 1 describes the interference between the tags 6-9 and RW apparatuses 10-12, the interference between the RW apparatuses 10-12 can also be reduced because the adjacent RW apparatuses employ polarized waves orthogonal to each other.

For example, although the RW apparatus 10 employs the polarized wave of V polarization, the RW apparatus 11 employs the polarized wave of H polarization. Thus, the RW apparatus 10 can prevent the interference by the signal from the RW apparatus 11. Although the RW apparatus 12 employs the same V polarization as the RW apparatus 10, the effect is too small to be significant because of the distance between them.

Embodiment 2

Figure 3:
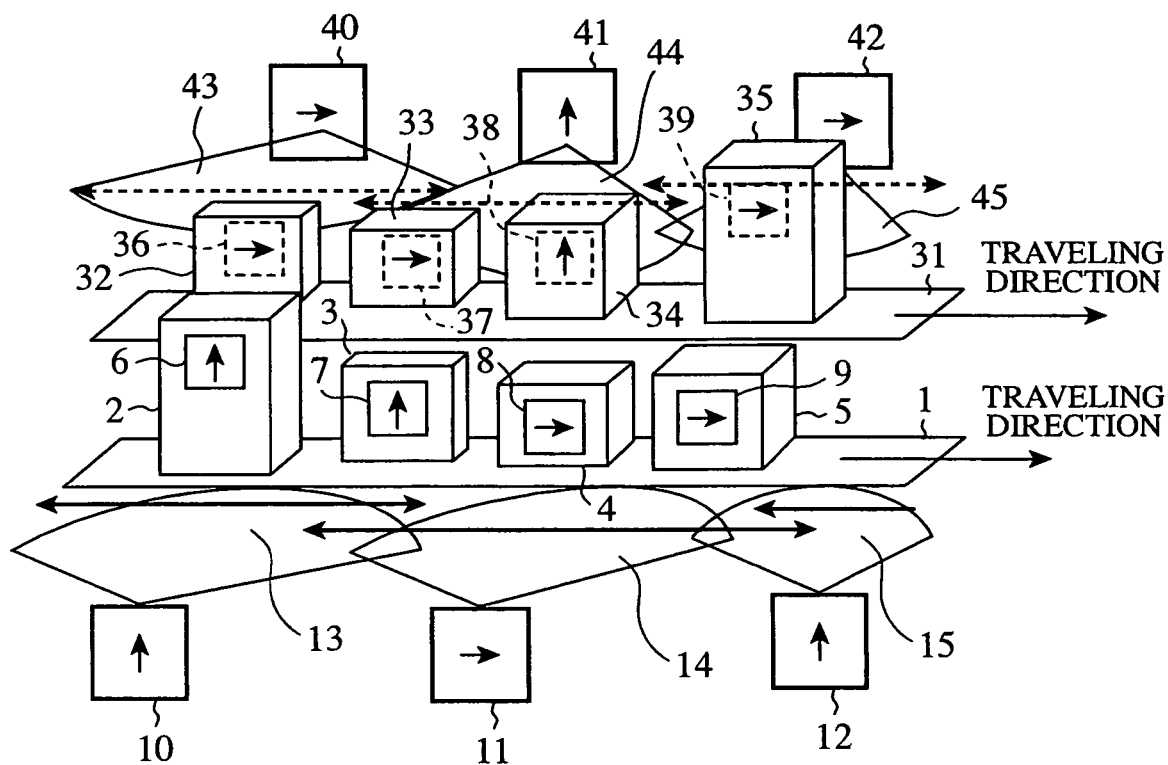
FIG. 3 is a diagram showing a configuration of a radio tag communication system of an embodiment 2 in accordance with the present invention.

FIG. 3 is a diagram showing a configuration of a radio tag communication system of an embodiment 2 in accordance with the present invention.

In FIG. 3, the same reference numerals designate the same or like portions to those of FIG. 1, and their description will be omitted here.

A conveyor 31, which is installed on the manufacturing line, for example, one-dimensionally carries articles 32-35 on which tags 36-39 are put. In the example of FIG. 3, the conveyor 31 moves the articles 32-35 toward the right.

The articles 32-35 are products in progress, for example, and can differ in size.

The tags 36-39, which are put on the articles 32-35, have a function of holding unique information on the articles 32-35 (such as identifying information of the articles), and a function of carrying out radio communication with RW apparatuses 40-42. In addition, the tags 36-39 have a function of switching the polarization direction as they move on.

The RW apparatuses 40-42 are arranged one-dimensionally along the direction in which the conveyor 31 moves the articles 32-35 in such a manner that the communication area 43 of the RW apparatus 40 and the communication area 44 of the RW apparatus 41 overlap each other, and the communication area 44 of the RW apparatus 41 and the communication area 45 of the RW apparatus 42 overlap each other. In addition, the RW apparatuses 40-42 carry out radio communication with the tags 36-39 to read and write the information held in the tags 36-39. In this case, polarized waves of the RW apparatuses 40 and 42 are set in the H polarization, and a polarized wave of the RW apparatus 41 is set in the V polarization. Thus, the polarized waves of the adjacent RW apparatuses are made orthogonal to each other. Furthermore, the polarized waves of the RW apparatuses 40-42 are made orthogonal to the polarized waves of the opposite RW apparatuses 10-12 in the adjacent lines.

Next, the operation will be described.

As shown in FIG. 3, the two manufacturing lines are installed in parallel, and the RW apparatuses 10-12 and RW apparatuses 40-42, which are employed there, are placed face to face.

Since radiation patterns of the RW apparatuses 10-12 and RW apparatuses 40-42 normally have directivity that becomes maximum in a front direction, the RW apparatuses set face to face interfere with each other.

Thus, interference can occur between the RW apparatus 10 and RW apparatus 40, between the RW apparatus 11 and RW apparatus 41 and between the RW apparatus 12 and RW apparatus 42.

However, since the present embodiment 2 makes the polarized waves of the opposite RW apparatuses orthogonal to each other, it can reduce the interference.

Embodiment 3

Figure 4:
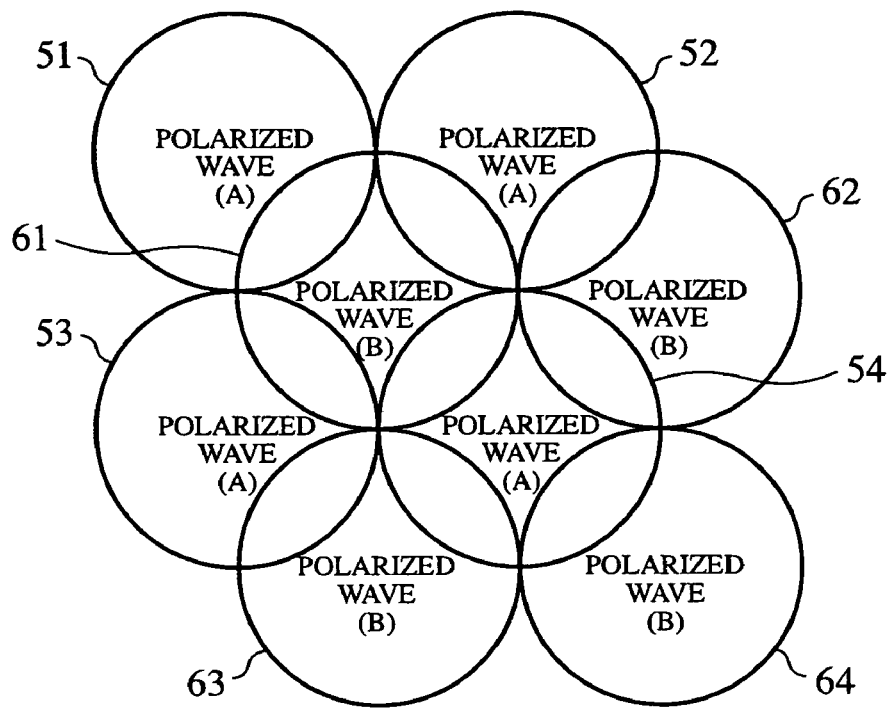
FIG. 4 is a diagram showing a configuration of a radio tag communication system of an embodiment 3 in accordance with the present invention.

FIG. 4 is a diagram showing a configuration of a radio tag communication system of an embodiment 3 in accordance with the present invention.

In FIG. 4, communication areas 51-54 are the communication areas of the RW apparatuses in which the polarized waves are set at a polarized wave (A); and communication areas 61-64 are the communication areas of the RW apparatuses in which the polarized waves are set at a polarized wave (B) orthogonal to the polarized wave (A).

The present embodiment 3 expands the movement of the articles of the foregoing embodiment 1 to two dimension. It supposes logistics management of the articles moving on the ground in a factory.

The communication areas 51-54 and 61-64 represent communication areas on the ground of a plurality of RW apparatuses that are fixed to the ceiling but are not shown. The communication areas with different reference numerals are communication areas of different RW apparatuses.

The polarized waves of the RW apparatuses are either the polarized wave (A) or polarized wave (B): the polarized waves of the RW apparatuses corresponding to the communication areas 51-54 are the polarized wave (A), and the polarized waves of the RW apparatuses corresponding to the communication areas 61-64 are the polarized wave (B).

To cover the ground closely with the communication areas, the communication areas must overlap one another.

In this case, it is likely that the signal interference occurs in the overlapping areas as in the foregoing embodiment 1.

In the present embodiment 3, however, the communication areas 51-54 and 61-64 are arranged in such a manner that the areas with the polarized wave (A) do not overlap each other, and the areas with the polarized wave (B) do not overlap each other, thereby being able to prevent the signal interference.

In the example of FIG. 4, the communication areas 51-54 are arranged in a square in such a manner that they do not overlap each other.

Likewise, the communication areas 61-64 are arranged in a square in such a manner that they do not overlap each other.

The areas with the polarized wave (A) and the areas with the polarized wave (B) are shifted in a diagonal direction by a distance half the diagonal of the square.

Although the polarized waves are not specified here, two orthogonal polarized waves can be used.

As is clear from the foregoing description, the present embodiment 3 makes, when a plurality of RW apparatuses are arranged two-dimensionally, the polarized waves of the adjacent RW apparatuses orthogonal to each other. As a result, the present embodiment 3 offers an advantage of being able to prevent the signal interference even when the plurality of RW apparatuses are arranged two-dimensionally.

Embodiment 4

Figure 5:
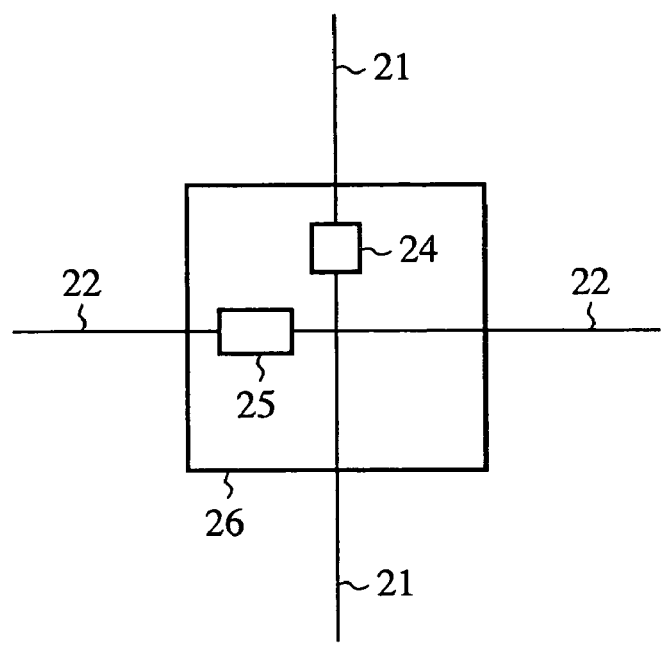
FIG. 5 is a diagram showing a configuration of a tag of a radio tag communication system of an embodiment 4 in accordance with the present invention.

FIG. 5 is a diagram showing a configuration of a tag of a radio tag communication system of an embodiment 4 in accordance with the present invention.

In FIG. 5, since the same reference numerals designate the same or like portions to those of FIG. 2, their description will be omitted here.

A communication processing section 24, under the instructions of an IC 26, receives a signal transmitted from the RW apparatus 10 (or RW apparatus 12) and transmits a signal to the RW apparatus 10 (or RW apparatus 12) via the dipole antenna 21 with the V polarization.

A communication processing section 25, under the instructions of the IC 26, receives a signal transmitted from the RW apparatus 11 and transmits a signal to the RW apparatus 11 via the dipole antenna 22 with the H polarization.

The IC 26 controls the processing of the communication processing sections 24 and 25. The IC 26 includes a memory holding the unique information on the articles 2-5. In addition, the IC 26 includes a rectifying section that rectifies the call signal, converts it to the driving power, and stores the power, when the dipole antennas 21 and 22 receive the call signal, the high-frequency signal, transmitted from the RW apparatuses 10-12.

Although the foregoing embodiments 1-3 are described by way of example in which the tag switches the polarization direction with the movement of the article, the present embodiment 4 has the tag handle the two polarized waves which are orthogonal to each other at the same time.

The details are as follows.

For example, the tag 7 put on the article 3 is present in the area in which the communication area 13 of the RW apparatus 10 and the communication area 14 of the RW apparatus 11 overlap.

Accordingly, the dipole antenna 21 of the tag 7, which is set in the V polarization state, is in the excitable state, and the dipole antenna 22 of the tag 7, which is set in the H polarization state, is also in the excitable state.

Therefore when the RW apparatus 10 transmits the call signal, the dipole antenna 21 of the tag 7 receives the call signal.

When the dipole antenna 21 receives the call signal transmitted from the RW apparatus 10, the rectifying section in the IC 26 of the tag 7 rectifies the call signal, converts it to the driving power, and stores the power.

The IC 26 of the tag 7 transmits the response signal to the call signal to the RW apparatus 10 via the dipole antenna 21.

Likewise, when the RW apparatus 11 transmits the call signal, the dipole antenna 22 of the tag 7 receives the call signal.

When the dipole antenna 22 receives the call signal transmitted from the RW apparatus 11, the rectifying section in the IC 26 of the tag 7 rectifies the call signal, converts it to the driving power, and stores the power.

The IC 26 of the tag 7 transmits the response signal to the call signal to the RW apparatus 11 via the dipole antenna 22.

In this way, from this time on, the radio communications become possible between the tag 7 and RW apparatus 10 and between the tag 7 and RW apparatus 11. The radio communication with the RW apparatus 10 is carried out by a processing system composed of the dipole antenna 21 and the communication processing section 24. The radio communication with the RW apparatus 11 is carried out by a processing system composed of the dipole antenna 22 and the communication processing section 25.

Thus, the separate, independent two processing systems can carry out radio communications with the corresponding RW apparatuses without being affected by the other processing systems. As a result, the present embodiment 4 offers an advantage of being able to prevent the signal interference even when the communication areas of the adjacent RW apparatuses overlap.

Incidentally, it is possible for the present embodiment 4 to make the overlapping areas greater than those of the foregoing embodiments 1-3, and to implement high speed communications in those areas.

More specifically, since the V polarization and H polarization can carry out independent communications, communication rate can be doubled as compared with the case where the polarized waves are used singly.

INDUSTRIAL APPLICABILITY

As described above, the radio tag communication system in accordance with the present invention is suitable for a system that necessitates expanding the communication area of the tag by arranging the plurality of RW apparatuses in such a fashion that the communication areas of the adjacent RW apparatuses overlap one another.

What is claimed is:

1. A radio tag communication system including a tag holding information, and reader/writer apparatuses for performing reading and writing of the information held in the tag by carrying out radio communication with the tag, said radio tag communication system, having a plurality of reader/writer apparatuses arranged in a manner that communication areas of adjacent reader/writer apparatuses overlap one another, makes polarized waves of the adjacent reader/writer apparatuses orthogonal to each other, and causes the tag to switch a polarization direction with a movement of the tag.

2. The radio tag communication system according to claim 1, further comprising a conveyor for one-dimensionally carrying an article on which the tag is put, wherein the plurality of reader/writer apparatuses are arranged one-dimensionally in a direction in which the conveyor carries the article.

3. The radio tag communication system according to claim 1, wherein when the plurality of reader/writer apparatuses are arranged one-dimensionally in a plurality of lines, the reader/writer apparatuses which are face to face in adjacent lines have their polarized waves made orthogonal to each other.

4. The radio tag communication system according to claim 3, further comprising a plurality of lines of conveyors each for one-dimensionally carrying an article on which the tag is put, wherein the plurality of reader/writer apparatuses are arranged one-dimensionally in the plurality of lines in a direction in which the conveyors carry the article.

5. The radio tag communication system according to claim 1, wherein when the plurality of reader/writer apparatuses are arranged two-dimensionally, polarized waves of adjacent reader/writer apparatuses are made orthogonal to each other.

6. The radio tag communication system according to claim 1, wherein when the tag receives a switching request signal from one of the reader/writer apparatuses during communication, the tag switches the polarization direction.

7. A radio tag communication system including a tag holding information, and reader/writer apparatuses for performing reading and writing of the information held in the tag by carrying out radio communication with the tag, said radio tag communication system, having a plurality of reader/writer apparatuses arranged in a manner that communication areas of adjacent reader/writer apparatuses overlap one another, makes polarized waves of the adjacent reader/writer apparatuses orthogonal to each other, and provides the tag with a function to handle two polarized waves simultaneously which are orthogonal to each other.

* * * * *